Sept. 8, 1959      B. BARENYI      2,903,296
AUTOMOBILE WITH FLAP DOOR
Filed April 4, 1955      3 Sheets-Sheet 1
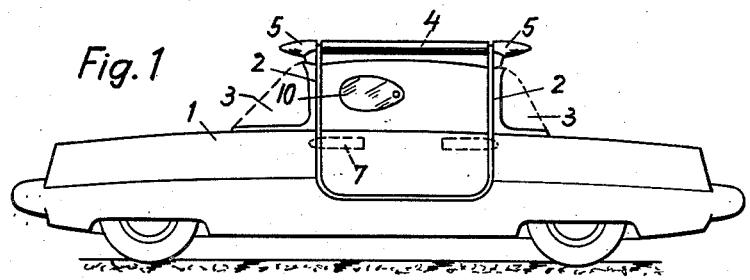
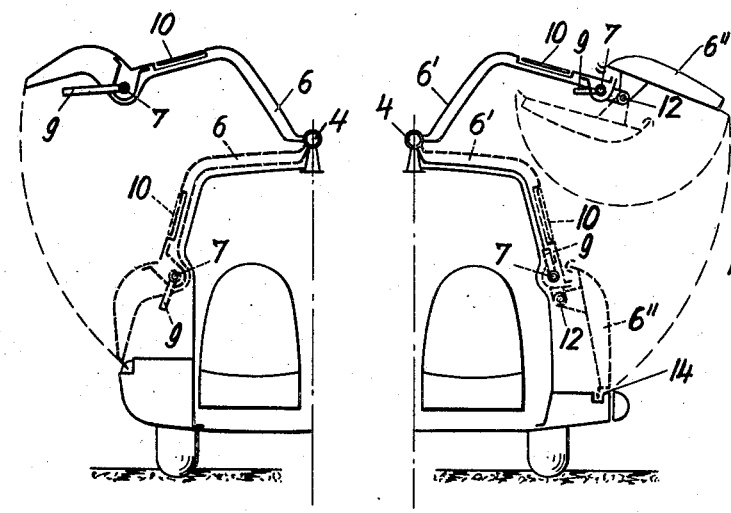
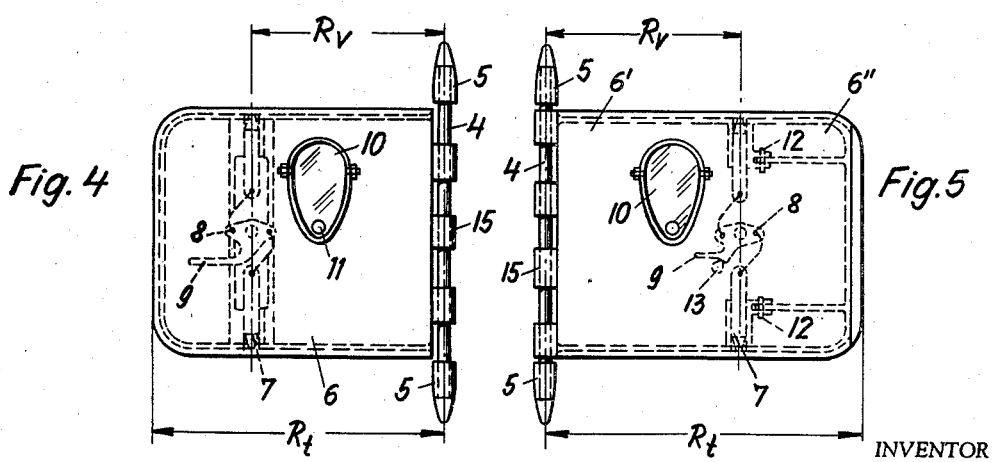
INVENTOR
BELA BARENYI
BY Dicke and Craig
ATTORNEYS Sept. 8, 1959   B. BARENYI   2,903,296
AUTOMOBILE WITH FLAP DOOR
Filed April 4, 1955   3 Sheets-Sheet 2
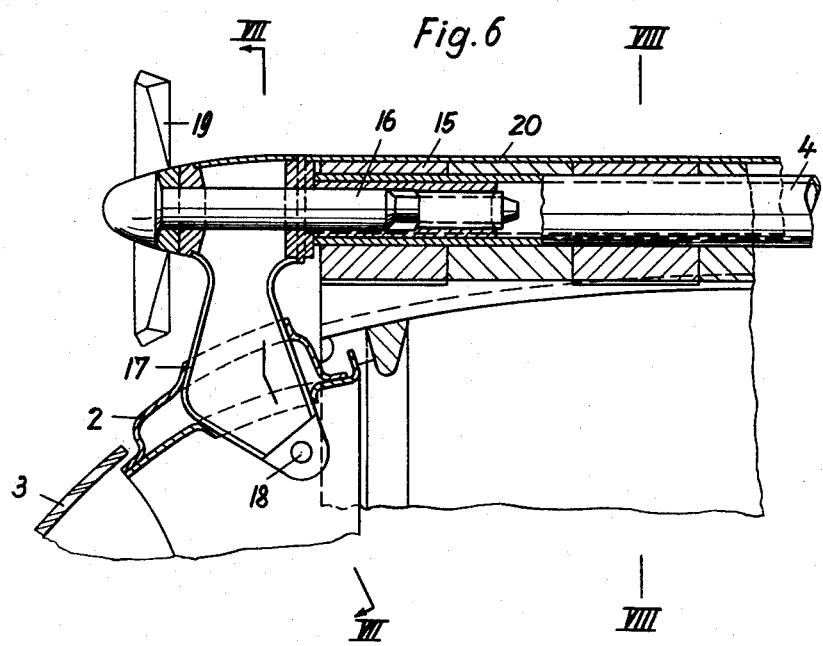
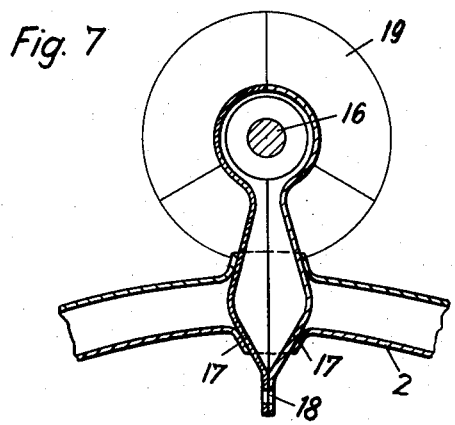
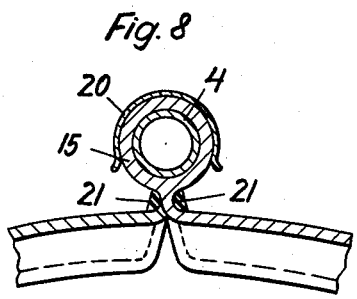
INVENTOR
BELA BARENYI
BY Dicke and Craig.
ATTORNEYS

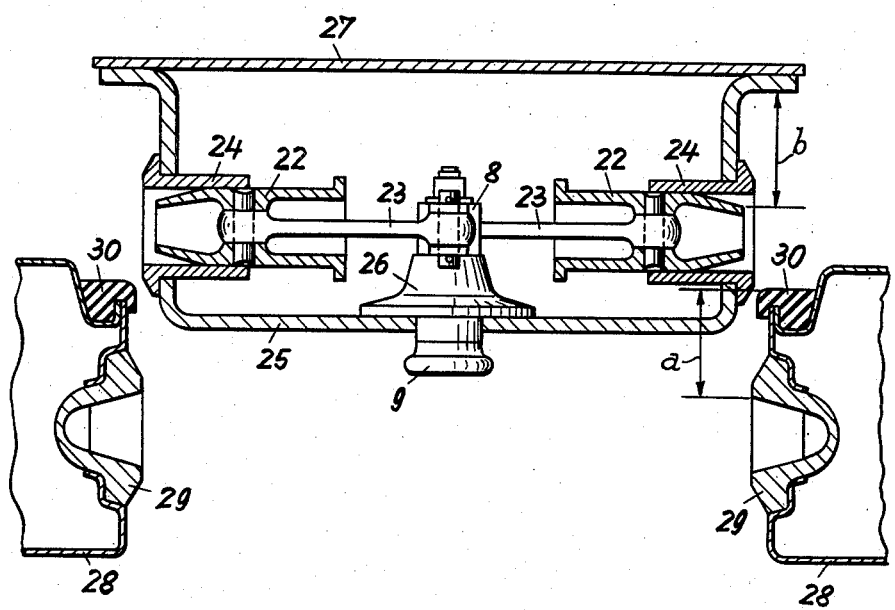
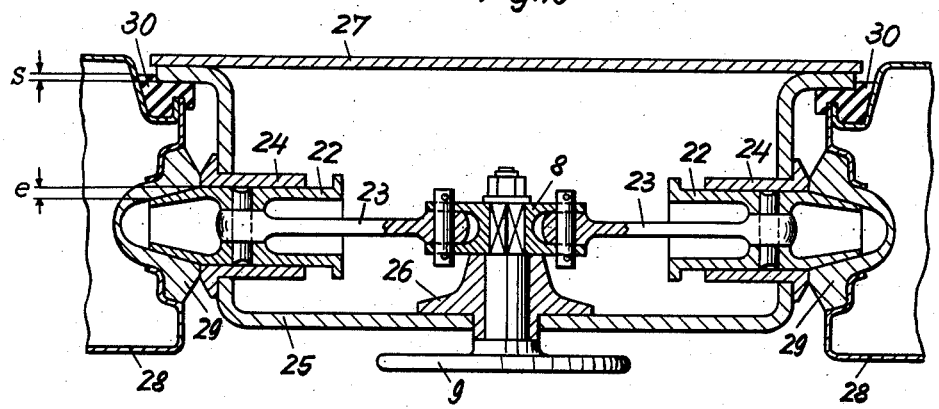

United States Patent Office 2,903,296
Patented Sept. 8, 1959

2,903,296

AUTOMOBILE WITH FLAP DOOR

Béla Barenyi, Stuttgart-Hohenheim, Germany, assignor to Daimler-Benz Aktiengesellschaft, Stuttgart-Unterturkheim, Germany Application April 4, 1955, Serial No. 499,083

Claims priority, application Germany April 7, 1954

11 Claims. (Cl. 296—44)

The present invention relates to improvements in automobiles, and more particularly to automobiles with a closed body, for example, of the sedan type, and provided with at least one flap door which is pivotally mounted substantially at the middle of the car about an axis which extends in the longitudinal direction of the car.

A known automobile construction of this type was designed so that the locking mechanism of the flap door was provided within the area of the horizontal outer edge of the entrance into the passenger compartment. This had the serious disadvantage, on the one hand, that the locking mechanism projected from the door into the compartment and, on the other hand, that those parts of the locking mechanism which were mounted on the door frame were located directly at the edge of the entrance and thus entailed the danger of becoming easily soiled, obstructed, and useless. Furthermore, the relatively large distance between the locking mechanism and the door hinges rendered it very difficult to seal the lateral edges of the door since it had the tendency between the hinges and the locking mechanism to bulge outwardly.

It is one of the objects of the present invention to provide a flap-type door structure for automobiles which overcomes the above-mentioned disadvantages in a very simple manner by providing the locking mechanism of the door adjacent to the lateral edges thereof at a point intermediate the door hinge and the horizontal outer or lower edge of the door. If, in the particular automobile design, the upper part of the car body is set off from the lower part at the belt line of the body, the locking mechanism is preferably provided adjacent the setoff.

While the prior automobile designs with flap doors were never used in, or even intended for, standard mass production, but only for custom-made cars of special design, it is an object of the present invention to provide a car body of such type which is suitable for a production on a large scale.

According to the present invention, the locking mechanism for the flap door preferably consists of a locking bolt on each lateral edge of the door, and means for moving such bolts simultaneously in opposite directions to each other.

A preferred feature of the invention for carrying out this object consists in the provision of a pair of plungers which are mounted within the door and are slideable therein within suitable guiding means, and an articulated connection between such plungers and an intermediate rotary operating member by means of a pair of connecting rods.

Another object and feature of the invention consists in a reliable locking mechanism which is obtained by making both the outer ends of the plungers which are adapted to engage with the corresponding bolt opening in the door frame, as well as these openings themselves of a conical shape.

Another object of the present invention resides in providing resilient sealing means between the car doors and their frames which permit the door to be easily opened and closed and also form a reliable seal of the gap between the door and the door frame.

A feature of the invention for attaining this object consists in making the distance between the conical bores in the door frame and the outer surface of the sealing strip on the frame smaller than the distance between the tip of the bolt plunger and the door surface abutting upon the sealing strip. Such construction permits the conical tip of the bolt plunger to project into the corresponding bore in the frame already at the time when the door is being closed and when the resilient sealing strip has not as yet been compressed, while by sliding the plunger into the conical bore in the frame, the door will be further moved into the frame and tightened against the car body, and its supporting surface or edge portion will thereby be pressed into the resilient sealing strip without requiring any additional physical effort.

Another object of the present invention is to provide a flap door for automobiles which does not require any handle at the outside of the door for opening and closing the same.

This object may be obtained according to the invention by providing the handle for operating the locking mechanism only on the inside of the car and by providing a suitable opening through which such handle can be reached from the outside. According to a further feature of the invention, such opening may be provided with a suitable closure which may be opened and closed, as well as locked from the outside, and if desirable also from the inside, and which permits the normal lock of the car door to be either entirely dispensed with or to be mounted independently of the locking mechanism of the door at some other part of the car body.

Another object of the present invention resides in the provision of such a closure or flap within the door window above the actuating element of the locking mechanism, and a further object resides in designing and constructing such a closure in the form of a pivoting window which may also be used for ventilating the interior of the car.

Another object of the present invention consists in considerably simplifying the manufacture and installation of the locking mechanism of the flap door by designing and building the same as a self-contained unit which may be mounted within a housing on the inside of the door.

A further object of the present invention consists in making such housing of the locking mechanism of a synthetic material, such as a plastic or the like, which may be easily secured to the door, for example, by being cemented thereto.

Another object of the invention is to avoid the use of lubricants in the locking mechanism by making the moveable parts thereof and/or their guiding means of a self-lubricating synthetic material. Thus, for example, it is possible to make the guiding elements of the bolt plungers both within the door as well as the door frame in the form of separate inserts which may be cemented into suitable openings in the respective walls carrying the same.

An important safety feature of the present invention further consists in mounting the operating handle of the locking mechanism at a point between the inner wall of the door and the wall of the lock housing which projects inwardly as far as possible beyond such inner wall. Such feature has the advantage that in collisions the driver, as well as the person next to him will be protected from injuries caused by the operating handle of the locking mechanism. Such handle is also preferably designed to extend downwardly through a suitable aperture in the lock housing.

Another object of the present invention is to provide a flap door for an automobile which projects laterally as little as possible, or not at all, beyond the outer contours of the car body. This object may be achieved according to the invention by preferably making the door of two sections, with the lower section being mounted on the upper section so as to be pivotable thereto about a substantially horizontal axis. This pivoting axis is preferably placed so as to coincide substantially with the axis of the locking mechanism. The two sections of the door may also be connected to each other so that when the door is raised, the lower section thereof will be pivoted positively and of its own accord.

The design of the flap door in two sections has the further important advantage that the lower edge of the lower section may engage in a groove in the edge or sill forming the entry into the car and may thus form a perfect sealing means for the door.

Another object of the present invention consists in making the flap door of a single piece of transparent synthetic material, the lower part of which may be made opaque in any suitable manner. Independently of the construction of the door, its manufacture may be simplified considerably by curving it only in a vertical direction. When making the flap door of a synthetic material, the invention also provides reinforcements thereof, for example, in the form of ribs or the like which may either be molded together with the door proper or be cemented or fused thereto. Also, the present invention provides for such reinforcements of the door to be used as door hinges, as bearing or supporting means for the locking mechanism, or for similar purposes, or to serve as enclosures for such elements.

Another important and preferred feature of the invention consists in providing two opposite flap doors so as to be pivotable about a common axis which is preferably located within the central longitudinal plane of the car body. Such pivotal axis may preferably constitute an essential element of the car body by forming a connecting means of the transverse braces or supports of the body. These transverse supports may be provided with bearing blocks or brackets for mounting the pivot bolt of the flap doors, preferably in such a manner that they pass through these transverse supports and with their lower ends extend slightly into the interior of the car body. Such lower ends may, according to the invention also form a support upon which rear view mirrors, sun shields, or the like may be mounted. If, on the other hand, the upper ends of the bearing blocks or brackets be extended above the car roof, they may be used as supports either for mounting advertising signs, light fixtures, a radio antenna, or any other desired means thereon.

Still another feature of the invention consists in making the two opposite parts of the hinges, i.e. those on the door and those on the hinge itself, so as to interengage like prongs. For protecting the hinges from the weather, they may be provided with a suitable resilient sleeve or the like, while intermediate the adjacent door edges resilient sealing strips may also be provided.

Further objects, features, and advantages of the present invention will become apparent from the following detailed description thereof to be read in conjunction with the accompanying drawings, in which Fig. 1 shows a side view of an automobile designed according to the present invention;

Fig. 2 is a cross section taken through the left side of the car as shown in Fig. 1;

Fig. 3 is a cross section taken through the right side of the car, and shows a modification of the flap door;

Fig. 4 is a top view upon the flap door shown in Fig. 2;

Fig. 5 is a top view upon the flap door shown in Fig. 3;

Fig. 6 is an enlarged longitudinal section through the front bearing of the door hinge;

Fig. 7 is a cross section taken along line VII—VII of Fig. 6;

Fig. 8 is a cross section taken along line VIII—VIII of Fig. 6;

Fig. 9 is an enlarged longitudinal section through the locking mechanism of the flap door with the door in open position; while Fig. 10 shows the same section with the door in closed position.

Referring to the drawings, the numeral 1 indicates a car body of modern design provided with a closed top which is limited both in front and in the rear by a transverse support 2 and a curved window 3. At their apices extending along the central longitudinal plane of the car, these two transverse supports 2 are connected with each other by means of a shaft 4 which forms the hinge bolt of two opposite flap doors and is mounted, with its axis generally horizontal, on two bearing blocks or brackets 5. In the embodiment of the invention as shown in Figs. 2 and 4, the door 6 is made of a single plate, preferably of a glasslike transparent synthetic material, the lower part of which is set off so as to project outwardly from the narrower upper part of the body and is made opaque by any suitable means. The junction of upper and lower parts of the body at the set-off defines a belt line extending longitudinally at the sides of the vehicle. The inside of the door 6 opposite to this setoff has mounted thereon a locking mechanism 7, the details of which will be subsequently described with reference to Figs. 9 and 10. This locking mechanism is spaced from the hinge bolt 4 by a distance $R_v$, while the horizontal lower or outer edge of the door is spaced from the hinge bolt 4 by a distance $R_t$. In Figures 4 and 5, it is clear that the distance $R_v$ is substantially less than the distance $R_t$ so that the axis of the locking mechanism 7 is spaced from the lower edges of the doors. The locking mechanism 7 may be operated by a pivoting member 8 having a lever 9 thereon which serves as a handle and extends substantially vertically in a downward direction. This handle 9 as seen from the driver's seat, is mounted so as to lie behind the inwardly projecting edge of the locking mechanism 7. The transparent upper part of the flap door 6 has mounted therein a window 10 which is pivotable about a substantially vertical axis. In this particular embodiment of the invention, the pivotable window 10 is provided with a suitable lock, for example, a cylinder lock 11 which serves as the main door lock. From this description and the drawings it will be appreciated that the locking mechanism 7 may only be operated from the inside so that, when the door is to be opened from the outside, it will be necessary to reach through the window 10 after the same has been unlocked and pivoted to its open position.

The embodiment of the invention as shown in Figs. 3 and 5 differs from that previously described principally by the fact that the flap door consists of two parts, that is, an upper section 6' and a lower section 6" which are pivotally connected to each other so that, when the door is open, the lower section 6" may be pivoted inwardly about a horizontal axis 12, as illustrated in Fig. 3 in dotted lines. If desired, the pivotal axis 12 of the lower door section 6" may also be placed so as to coincide with the axis of the locking mechanism 7 which is mounted on the upper door section 6'. The locking mechanism 7 of this embodiment of the invention is designed so that the handle 9 points upwardly and that the pivoting member 8 is provided with a cylinder lock which may be locked by a key 13. The hinged construction of the door of this embodiment also permits the horizontal outer or lower edge thereof to engage in a groove 14 in the outer edge or sill of the door frame.

The two flap doors 6 are mounted on the pivot bolt 4 by means of hinge eyes 15, and these eyes 15 of the two doors are set off relative to each other so as to interengage with each other. As may be seen from Figs. 6 to 8, the hinge bolt 4 is preferably of hollow shape and mounted in a suitable manner between the two brackets 5 by means of journals 16. The mounting brackets 5 may consist, for example, of two half-shells 17 of sheet metal, the lower end of which passes through the transverse supports 2 and may form a support 18 upon which a rear-view mirror, two sun shields, or any other desired implements may be mounted. An advertising sign 19 or a radio antenna or the like may also be mounted on one or both of the brackets 5 so as to extend outwardly from their outer ends or intermediate the same. The hinge eyes 15 of the two flap doors are preferably covered by a sleeve 20 or the like which may be of resilient material so as to snap over the hinge eyes 15 and protect the same from the weather. Finally, resilient sealing strips 21 may be provided on the abutting door edges below the hinge eyes 15, as shown in Fig. 8.

The locking mechanism, according to the modification of the invention as illustrated in Figs. 9 and 10 consists of two plungers 22 which are moveable in opposite directions and each of which is pivotally connected with the rotary member 8 by a connecting rod 23. The two plungers 22 are slideably guided within opposite sleeves or bushings 24 which are mounted within a housing 25. This housing 25 also carries a sleeve bearing 26 for the rotary member 8 and is mounted on the inside surface of the outer wall 27 of the flap door. All the parts of the locking mechanism, including the housing 25 may be made of synthetic material, and the plungers 22 and the bushings 24 preferably consist of a synthetic material having self-lubricating properties. The bushings 24 may be cemented or fused into the corresponding openings in the housing 25, and the latter may also be cemented or fused to the door wall 27. The front end of the plungers 22 is preferably made of conical shape so that the radius of the plunger bushings 24 and the tip of the plungers will differ by a distance e. The door frame 28 carries two conical sockets 29 which preferably consist of synthetic material and are cemented or fused into suitable apertures in the door frame 28. The outer edge of the door frame 28 may also be provided with a sealing strip 30 of resilient material. As illustrated in Fig. 10, this sealing strip 30 is preferably made of a shape and size so that the distance s by which the strip will be compressed when the door is closed will be slightly smaller than the distance e, or expressed in relation to Figure 9, when the door is in an open position, the distance a between the larger opening of the socket 29 and the outer surface of the sealing strip 30 on the door frame 28 is smaller than the distance b between the end of the conical plunger 22 and the surface of the door 27 which engages the sealing strip 30. When the door is being closed, this structure will permit the reduced tip of the plungers 22 to lie within the opening of the sockets 29, even though the door only rests loosely on the sealing strip 30. Then, by sliding the conical tips of the plungers 22 into the corresponding sockets 29, the door may be easily and safely closed.

As distinguished from the modification shown in Figs. 9 and 10, the handle 9, as shown in Figs. 2 to 5, may also be connected with the rotary member 8 so as to project beyond the same either in upward or downward direction through a slot in the housing 25 but to lie behind the wall of the housing facing the driver's seat.

Although my invention has been illustrated and described with reference to the preferred embodiments thereof I wish to have it understood that it is in no way limited to the details of such embodiments or to the specific examples described, but is capable of numerous modifications within the scope of the appended claims.

Having thus fully disclosed my invention, what I claim is:

1. In combination with an automobile having a closed body with a set-off portion in the belt line thereof, a door frame in said body, at least one flap door on said body for closing said frame, means for pivoting said door in an upward and downward direction about a generally horizontal axis located substantially within the vertical longitudinal center plane of said automobile, locking means for locking said door, said locking means being located at the lateral edges of said door within a plane adjacent said set-off portion, said locking means comprising a pair of plungers, means within said door for guiding said plungers, a rotary member, means for connecting said plungers to said rotary member so as to move said plungers in opposite directions, wherein said locking means includes only one handle mounted on the inside of said door for operating said locking means, a window in said door and above said handle, said window when open permitting access to said handle from the outside, means for opening and closing said window, and means for locking said window at least from the outside of said car, said opening and closing means comprising means for pivoting said window to an open and closed position within said door.

2. In an automobile as defined in claim 1, wherein said locking means further includes only one handle on the inside of said door for operating said locking means located intermediate said inner wall of said door and the wall of said housing projecting farthest inwardly of said body when said door is closed, said operating handle comprising a lever extending from the inside of said housing through a slot in the wall thereof in a downward direction.

3. In combination with an automobile having a closed body with a belt line defined by the junction of upper and lower parts of the body, a door frame in said body, at least one flap door on said body for closing said frame, means for pivoting said door in an upward and downward direction about a generally horizontal axis located substantially within the vertical longitudinal center plane of said automobile, locking means for locking said door, said locking means being located at the lateral edges of said door adjacent the belt line of said body and intermediate the pivoting means and the lower edge of the door, said locking means comprising a pair of plungers, means within said door for guiding said plungers, a common actuating member for said plungers, means for connecting said plungers to said member so as to move said plungers in opposite directions, said locking means including only one handle mounted on the inside of said door for operating said locking means, said door having an aperture therein for access to said handle from the outside, a closure for said aperture, and means for locking said closure at least from the outside of said car.

4. In combination with an automobile having a closed body with a belt line defined by the junction of upper and lower parts of the body, a door frame in said body, at least one flap door on said body for closing said frame, means for pivoting said door in an upward and downward direction about a generally horizontal axis located substantially within the vertical longitudinal center plane of said automobile, locking means for locking said door, said locking means being located at the lateral edges of said door adjacent the belt line of said body and intermediate the pivoting means and the lower edge of the door, said locking means comprising a pair of plungers, means within said door for guiding said plungers, a common actuating member for said plungers, means for connecting said plungers to said members so as to move said plungers in opposite directions, said locking means including only one handle mounted on the inside of said door for operating said locking means, a window in said door and above said handle, said window when open permitting access to said handle from the outside, means for opening and closing said window, and means for locking said window at least from the outside of said car.

5. In combination with an automobile having a closed body with a belt line defined by the junction of upper and lower parts of the body, a door frame in said body, at least one flap door on said body for closing said frame, means for pivoting said door in an upward and downward direction about a generally horizontal axis located substantially within the vertical longitudinal center plane of said automobile, locking means for locking said door, said locking means being located at the lateral edges of said door adjacent the belt line of said body and intermediate the pivoting means and the lower edge of the door, said locking means include a pair of plungers mounted within said door, and guiding means within said door and said door frame for guiding said plungers and locking said door to said frame, said guiding means forming separate inserts of synthetic material and cemented within suitable openings provided in the walls of said door and said door frame, a rotary member, means for connecting said plungers to said rotary member so as to move said plungers in opposite directions.

6. In combination with an automobile having a closed body with a belt line defined by the junction of upper and lower parts of the body, a door frame in said body, two doors located on opposite sides of said body for closing said frame, means for pivoting said doors in an upward and downward direction about a common generally horizontal axis located substantially within the vertical longitudinal center plane of said automobile, each said door comprising locking means for locking said door, said locking means being located at the lateral edges of said door adjacent the belt line of said body and intermediate the pivoting means and the lower edge of the door, said locking means comprising a pair of plungers, means within said door for guiding said plungers, a common actuating member for said plungers, means for connecting said plungers to said member so as to move said plungers in opposite directions, a pair of transverse supports adjacent the lateral sides of said doors, a pivot bolt forming the pivoting axis of said doors, said pivot bolt connecting said transverse supports.

7. In an automobile as defined in claim 6, means for mounting said pivot bolt on said transverse supports, said mounting means projecting above the roof of said body and being adapted for mounting different accessories thereon.

8. In combination with an automobile having a closed body with a belt line defined by the junction of upper and lower parts of the body, a door frame in said body, two doors located on opposite sides of said body for closing said frame, means for pivoting said doors in an upward and downward direction about a common generally horizontal axis located substantially within the vertical longitudinal center plane of said automobile, each said door comprising locking means for locking said door, said locking means being located at the lateral edges of said door adjacent the belt line of said body and intermediate the pivoting means and the lower edge of the door, said locking means comprising a pair of plungers, means within said door for guiding said plungers, a common actuating member for said plungers, means for connecting said plungers to said member so as to move said plungers in opposite directions, a common pivot bolt supported by said body, each of said doors comprising hinge eyes on the upper end thereof, the hinge eyes of said doors inter-engaging each other and being mounted on the pivot bolt, and a resilient sleeve on said hinge eyes for protecting the same, and sealing strips of resilient material on the abutting door edges adjacent said hinge eyes.

9. In combination with an automobile having a closed body having a belt line defined by the junction of upper and lower parts of the body, a door frame in said body, at least one flap door on said body for closing said frame, means for pivoting said door in an upward and downward direction about a generally horizontal axis located substantially within the vertical longitudinal center plane of said automobile, locking means for locking said door, said locking means being located at the lateral edges of said door adjacent the belt line portion of said body and intermediate the pivoting means and the lower edge of the door, said locking means comprising a pair of plungers, means within said door for guiding said plungers, a rotary member, means for connecting said plungers to said rotary member so as to move said plungers in opposite directions, said plungers having conical outer ends, and conical sockets mounted within the door frame of said car body, said conical plunger ends being adapted to engage in said conical sockets when said rotary member is turned to lock said door, further comprising a resilient sealing strip intermediate said door and door frame, the distance between said socket and the outer surface of the sealing strip on said door frame being smaller than the distance between the end of the conical plunger and the surface of the door adapted as to engage said sealing strip.

10. In combination with an automobile having a closed body with a belt line defined by the junction of upper and lower parts of the body, a door frame in said body, two doors located on opposite sides of said body for closing said frame, means for pivoting said doors in an upward and downward direction about a common generally horizontal axis located substantially within the vertical longitudinal center plane of said automobile, each said door comprising locking means for locking said door, said locking means being located at the lateral edges of said door adjacent the belt line and intermediate the pivoting means and the lower edge of the door, said locking means comprising a pair of plungers, means within said door for guiding said plungers, a common actuating member for said plungers, means for connecting said plungers to said member so as to move said plungers in opposite directions, said car body further including a pair of transverse supports adjacent the lateral sides of said doors, said pivoting axis of said doors being formed by a pivot bolt, and means for mounting said pivot bolt on said transverse supports, said mounting means extending through said transverse supports and with their lower ends into the interior of said car body, the lower ends of said mounting means extending into the interior of said car body being provided with means adapted to mount thereon various accessories.

11. In combination with an automobile having a closed body having a belt line defined by the junction of upper and lower parts of the body, a door frame in said body, at least one flap door on said body for closing said frame, means for pivoting said door in an upward and downward direction about a generally horizontal axis located substantially within the vertical longitudinal center plane of said automobile, locking means for locking said door, said locking means being located at the lateral edges of said door adjacent the belt line portion of said body and intermediate the pivoting means and the lower edge of the door, said locking means comprising a pair of plungers engageable with portions of said frame, means within said door for guiding said plungers, a rotary member, means for connecting said plungers to said rotary member so as to move said plungers in opposite directions, a housing, said locking means being mounted within said housing, said locking means together with said housing forming a self-contained unit for mounting on the inside of said door, at least part of said housing forming bearing means for the plungers of said locking means, said housing consisting of synthetic material and being cemented to said door.

References Cited in the file of this patent

UNITED STATES PATENTS

| | | |
|---|---|---|
| 1,901,994 | Soss | Mar. 21, 1933 |
| 1,909,697 | McBeth et al. | May 16, 1933 |
| 2,048,181 | Cook | July 21, 1936 |
| 2,197,950 | Schwenk | Apr. 23, 1940 |
| 2,422,912 | Kling | June 24, 1947 |
| 2,496,737 | McCallick | Feb. 7, 1950 |

(Other references on following page)

UNITED STATES PATENTS

| | | | |
|---|---|---|---|
| 2,499,165 | Roethel | | Feb. 28, 1950 |
| 2,647,789 | Chayne | | Aug. 4, 1953 |

FOREIGN PATENTS

| | | | |
|---|---|---|---|
| 656,710 | France | | Jan. 5, 1929 |
| 854,148 | France | | Jan. 4, 1940 |
| 1,083,093 | France | | June 23, 1954 |
| 354,296 | Germany | | June 6, 1922 |
| 844,544 | Germany | | July 21, 1952 |
| 681,053 | Great Britain | | Oct. 15, 1952 |
| 249,968 | Italy | | Aug. 27, 1926 |

OTHER REFERENCES

Periodical: Machine Design, March 1954, pgs. 153–159 (only). Article: Designing Fabricated Nylon Parts.